Patented Mar. 5, 1929.

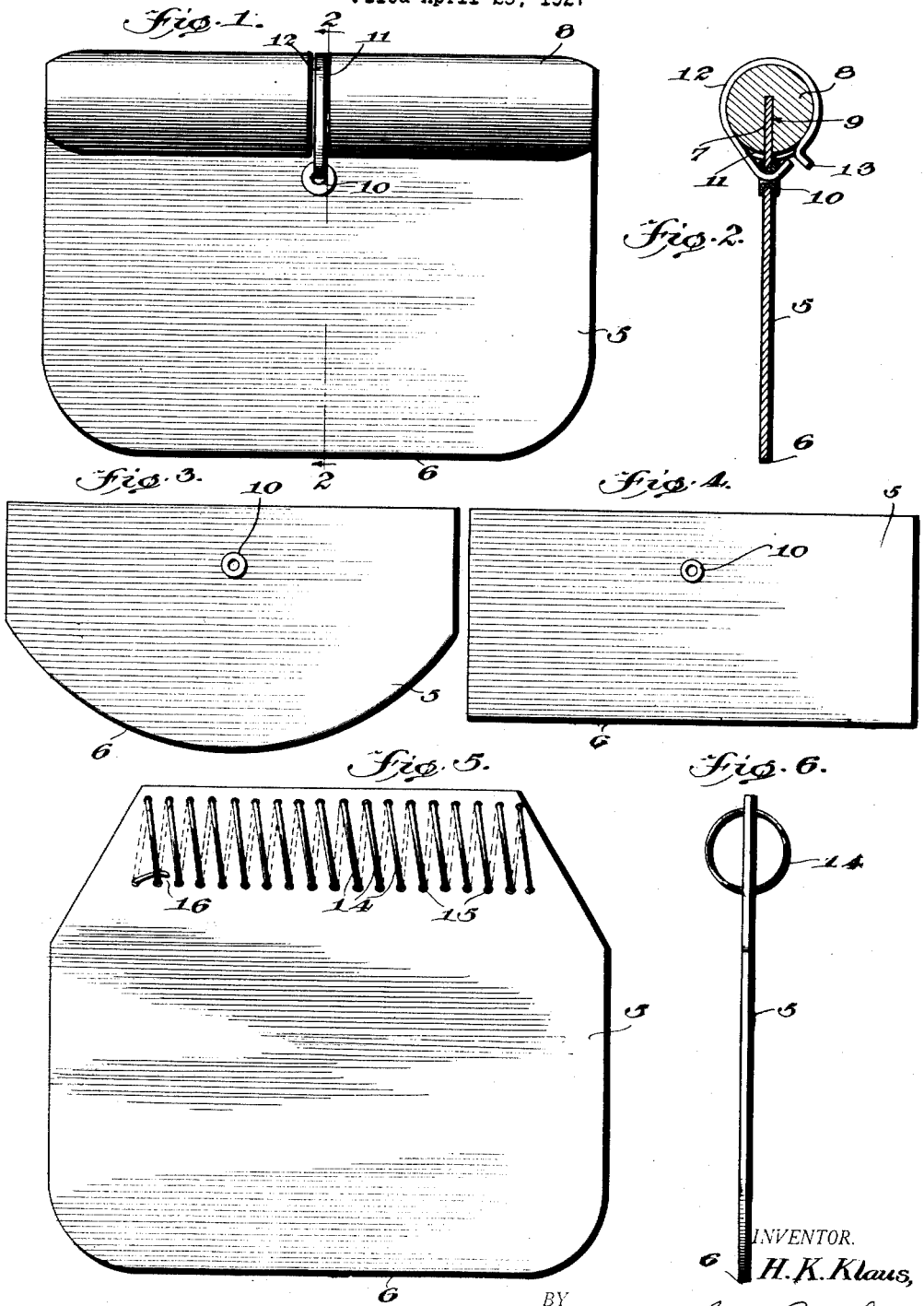

1,704,329

UNITED STATES PATENT OFFICE.

HERMAN K. KLAUS, OF BROOKLAWN, NEW JERSEY.

SCRAPER.

Application filed April 29, 1927. Serial No. 187,513.

My invention relates to scrapers for receptacles of various characters, such as cooking and baking pots and bowls where the food has become incrusted therein, and has for its principal object to provide a quickly detachable handle for the tool so that the same may be changed to scrapers of different sizes and shapes for use upon receptacles of different styles.

A further object is to provide an article of this character which is simple in construction, sanitary and inexpensive to manufacture.

Other objects and advantages reside in the special construction, combination and arrangement of the various elements forming the invention as more fully hereindescribed and claimed, reference being had to the accompanying drawing forming part hereof, wherein like numerals refer to like parts throughout, and in which Figure 1 is a plan view of a scraper blade showing my handle attached thereto, Figure 2 is a sectional view thereof taken on a line 2—2 of Figure 1, Figures 3 and 4 show certain modified shapes of blades, Figure 5 is a plan view of a blade to which is attached a modified form of handle and Figure 6 is an end view thereof.

Referring now to the drawing I have disclosed my invention comprising a scraper blade 5 preferably constructed of celluloid, but may also be of light weight, non-rustable steel and sufficiently flexible to substantially shape itself to the inner surface of a bowl or the like, and including a scraper edge 6 and a handle edge 7. I provide a cylindrically shaped handle 8, equal in length to the width of the blade, having a slot 9 extending longitudinally therein and in which the handle edge 7 of the blade is adapted to be received.

The blade has an opening in which is arranged an eyelet 10 to prevent splitting of the blade when made of celluloid and formed near the handle edge, midway between the sides thereof, and the handle has an annular groove 11 midway of its ends and within which a spring-tensioned wire ring 12 is adapted to fit, one end of said ring being inserted through the eyelet thereby securing the handle to the blade. The other end 13 of the ring is bent radially therefrom and forms a gripping means for spreading the ends of the ring apart so as to remove the same from the handle and eyelet.

The handle may be formed of any suitable material such as celluloid, wood or light weight non-rustable metal and it is obvious that the article when constructed as heretofore explained comprises a simple, durable and sanitary scraper and in which the handle is quickly detachable for use on other types and sizes of blades such as I have shown in Figures 3 and 4. The blade shown by Figure 3 has its scraping edge 6 curved and particularly adapted for bowls and that shown by Figure 4 is straight for use upon flat surfaces.

In Figures 5 and 6 I have disclosed a modified type of handle for the blade comprising a strand of spring like wire 14 spirally wound and having its convolutions threaded through upper and lower openings 15, the openings in the respective rows being staggered with respect to each other. The ends 16 of the wire are bent toward the center of the handle and hooked under the adjacent convolution thereof to prevent the withdrawal of the wire from the openings and secure the handle from turning.

I claim:

A scraper comprising a blade having an opening adjacent one edge thereof, a handle having a slot adapted to receive said edge of the blade and a resilient ring adapted to embrace the handle and retained in said opening.

In testimony whereof I affix my signature.

HERMAN K. KLAUS.